No. 780,495. PATENTED JAN. 24, 1905.
E. L. CLARK.
METALLIC PACKING.
APPLICATION FILED SEPT. 28, 1903.

WITNESSES
Edwin H. Samuels
Jas. J. Maloney

INVENTOR
Edwin L. Clark
by J. P. and H. Livermore
Attys.

No. 780,495. Patented January 24, 1905.

UNITED STATES PATENT OFFICE.

EDWIN L. CLARK, OF AUBURNDALE, MASSACHUSETTS, ASSIGNOR TO HENRY J. LIVERMORE, TRUSTEE, OF MEDFORD, MASSACHUSETTS.

METALLIC PACKING.

SPECIFICATION forming part of Letters Patent No. 780,495, dated January 24, 1905.

Application filed September 28, 1903. Serial No. 174,945.

*To all whom it may concern:*

Be it known that I, EDWIN L. CLARK, of Auburndale, county of Middlesex, and State of Massachusetts, have invented an Improvement in Metallic Packing, of which the following description, in connection with the accompanying drawings, is a specification, like letters on the drawings representing like parts.

The present invention relates to a metallic packing, the object of the invention being to produce an efficient and durable packing which may be easily applied and removed, and the invention is embodied in a packing of metal threads (that it to say, shredded metal) combined with a matrix or binding composed of rubber and graphite, the purpose of which is to form a homogeneous strip of packing without impairing the efficiency which has been found to be attainable by using as packing a simple mass of fibrous metal.

In other words, the present invention consists in a packing having a core of metal threads or fibers combined with a matrix composed of rubber and graphite, the matrix being vulcanized with the core therein, so as to hold together the parts of the said core, which would otherwise be independent and separable.

Figure 1:
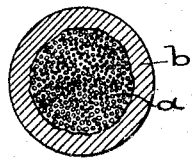
Figure 3:
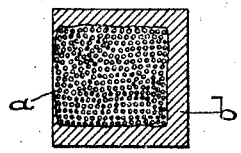
Figure 2:
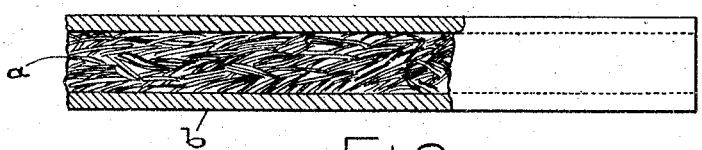

Figure 1 is a transverse section of a strip of packing embodying the invention; Fig. 2, a view, partly in longitudinal section and partly in elevation, of the same; Fig. 3, a view similar to Fig. 1, but showing a modification; and Fig. 4, a sectional elevation of a stuffing-box, showing the application of the packing to a piston-rod.

The packing embodying the invention consists of a suitable metal which should be soft and pliable, so as not to wear the working member of the parts packed, combined with a binding or matrix which serves to keep the metal part or core of the packing in shape and also to lubricate the same.

As herein shown, the metallic threads *a*, which may, for example, be of Babbitt metal, shredded by a drawing process or otherwise, are incased or bound together in a matrix or binding *b*, composed of rubber and graphite brought into intimate relation with each other and with the metal threads and subsequently vulcanized. In practice the matrix may be made by mixing with crude rubber in a soft state a quantity of graphite and molding or otherwise forming the mixture into a sheet which is placed in a mold of any desired shape, the metallic portion or core being subsequently inserted and enveloped or partially enveloped by the previously-inserted matrix material. The complete packing thus formed in the mold may then be subjected to pressure and heat for the purpose of vulcanizing the matrix, thus completing the packing. The proportional amounts of graphite and rubber may be varied according to the uses to which the packing is to be applied, and the invention is therefore not limited to any specific proportions. It may be stated, however, that preferably not more than ten per cent. of the matrix material should be graphite, since the addition of any greater proportion of graphite renders it difficult to carry out the vulcanizing process.

Prior to the vulcanizing process the combined matrix and core are subjected to a heavy pressure, which forces the matrix material into close contact with the shredded or fibrous core, so that the said material fills up the interstices in said core and intermingles with the metal threads thereof, thus not only more effectually binding together the metallic components of the core, but also distributing lubricant, so to speak, throughout the said core and lessening the friction between the packing and the movable member after the packing is in place.

The function of the matrix portion of the packing is mainly to prevent the separation or disintegration of the fibrous or threaded metallic core, and in practice the part of the matrix which is next to the movable member wears away, and to compensate for such wear the metallic core is forced into engagement with the movable member by tightening the gland, the packing when once applied, partially worn away, and finally forced into place, thus becoming practically a fibrous metallic packing so far as performing the actual function of a packing is concerned, while the more or less flexible binding-matrix, although yielding before the pressure of the gland which forces the metal core into contact with the movable member, still constitutes an efficient binding to prevent the fibers or threads from separating.

It is obviously immaterial in what shape or form the packing is made, Figs. 1 and 2 showing the packing of cylindrical form, while Fig. 3 shows it as rectangular in cross-section.

Figure 4:
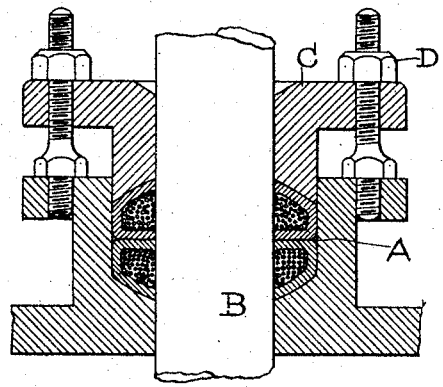

In Fig. 4 the packing is shown as applied to a piston-rod, there being one or more rings of packing of the shape shown in Fig. 3 placed in the stuffing-box A of the piston-rod B, the said rings being compressed against the said piston-rod by means of the gland c, operated by the stud-bolts D. The packing-rings are shown in Fig. 4 as having been used to some extent, the matrix portion next to the piston-rod being completely worn away, while the metallic-core portion has been forced into contact with said piston-rod by the compression of the gland.

Obviously my invention can be embodied in many different forms without departing from the spirit thereof, and I desire to claim my invention in the broadest manner legally possible.

I claim—

1. A packing consisting of a core of metal threads, said threads being arranged lengthwise of the core, and a matrix of a composition of rubber and graphite, said matrix being pressed and vulcanized to the core to hold the metal threads thereof together, substantially as described.

2. A packing consisting of a core of metal threads and a covering of a composition of rubber and graphite, said covering being pressed into the interstices of said core and vulcanized.

3. A packing consisting of a core of metal threads and a matrix of a composition of rubber and graphite said matrix filling up the interstices in said core and intermingling with said metal threads and being pressed and vulcanized to hold firmly together the metal threads of said core.

In testimony whereof I have signed my name to this specification in the presence of two subscribing witnesses.

EDWIN L. CLARK.

Witnesses:
J. H. RICH,
ALFRED H. HILDRETH.